United States Patent
Pires et al.

(10) Patent No.: US 9,183,023 B2
(45) Date of Patent: Nov. 10, 2015

(54) PROACTIVE DISTRIBUTION OF VIRTUAL ENVIRONMENT USER CREDENTIALS IN A SINGLE SIGN-ON SYSTEM

(75) Inventors: Jose Paulo Pires, Porto Alegre (BR); Valiuddin Y. Ali, Cypress, TX (US); Boris Balacheff, Bristol (GB); James M. Mann, Cypress, TX (US); Eduardo Moschetta, Rio Grande do Sul (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 39 days.

(21) Appl. No.: 13/809,411

(22) PCT Filed: Jul. 1, 2010

(86) PCT No.: PCT/US2010/040779
§ 371 (c)(1),
(2), (4) Date: Jan. 10, 2013

(87) PCT Pub. No.: WO2012/002971
PCT Pub. Date: Jan. 5, 2012

(65) Prior Publication Data
US 2013/0160013 A1 Jun. 20, 2013

(51) Int. Cl.
G06F 9/455 (2006.01)
H04L 29/06 (2006.01)
G06F 21/41 (2013.01)
G06F 21/30 (2013.01)
G06F 21/45 (2013.01)
G06F 21/57 (2013.01)

(52) U.S. Cl.
CPC ............ *G06F 9/45533* (2013.01); *G06F 21/30* (2013.01); *G06F 21/41* (2013.01); *G06F 21/45* (2013.01); *H04L 63/08* (2013.01); *G06F 21/57* (2013.01); *G06F 2009/45587* (2013.01)

(58) Field of Classification Search
None
See application file for complete search history.

(56) References Cited

U.S. PATENT DOCUMENTS

| 5,944,824 | A  | * | 8/1999  | He .................................... 726/6 |
| 6,438,600 | B1 | * | 8/2002  | Greenfield et al. ........... 709/229 |
| 7,150,038 | B1 | * | 12/2006 | Samar ................................ 726/8 |
| 7,509,672 | B1 | * | 3/2009  | Horwitz et al. .................... 726/8 |
| 7,552,209 | B2 |   | 6/2009  | Matsunami et al. |
| 7,571,473 | B1 | * | 8/2009  | Boydstun et al. ............... 726/21 |
| 7,676,829 | B1 | * | 3/2010  | Gui et al. .......................... 726/5 |
| 7,681,200 | B2 |   | 3/2010  | Wong |
| 7,735,122 | B1 | * | 6/2010  | Johnson et al. .................... 726/6 |
| 8,281,381 | B2 | * | 10/2012 | Kranendonk et al. ............ 726/8 |
| 8,327,428 | B2 | * | 12/2012 | Bailey et al. ...................... 726/8 |
| 8,443,429 | B1 | * | 5/2013  | Johnson et al. .................... 726/8 |
| 8,561,137 | B2 | * | 10/2013 | Sabin et al. ....................... 726/2 |

(Continued)

FOREIGN PATENT DOCUMENTS

| CN | 1452735 | 10/2003 |
| WO | WO-2009/022336 A2 | 2/2009 |

OTHER PUBLICATIONS

International Search Report and Written Opinion received in PCT Application No. PCT/US2010/040779, mailed Apr. 29, 2011, pp. 9.

*Primary Examiner* — Emerson Puente
*Assistant Examiner* — Benjamin Wu
(74) *Attorney, Agent, or Firm* — HP Legal Department

(57) ABSTRACT

An environment manager in a computer executes multiple environments concurrently. A user management framework (UMF) virtual machine an the computer runs an authentication domain that supports user profile management of the multiple environments.

15 Claims, 4 Drawing Sheets

(56) References Cited

U.S. PATENT DOCUMENTS

| | | |
|---|---|---|
| 8,769,642 B1 * | 7/2014 | O'Neill et al. ............... 726/5 |
| 8,782,403 B1 * | 7/2014 | Satish et al. ............... 713/165 |
| 2003/0065940 A1 * | 4/2003 | Brezak et al. ............... 713/201 |
| 2003/0163733 A1 * | 8/2003 | Barriga-Caceres et al. .. 713/201 |
| 2004/0260953 A1 * | 12/2004 | Jamieson et al. ............ 713/202 |
| 2005/0005094 A1 * | 1/2005 | Jamieson et al. ............ 713/155 |
| 2005/0108650 A1 * | 5/2005 | Muehlhausen ............... 715/760 |
| 2006/0075224 A1 * | 4/2006 | Tao ............................. 713/164 |
| 2006/0179326 A1 | 8/2006 | Leung |
| 2007/0089111 A1 * | 4/2007 | Robinson et al. ............. 718/1 |
| 2007/0130463 A1 * | 6/2007 | Law et al. ................... 713/168 |
| 2007/0220598 A1 * | 9/2007 | Salowey et al. .............. 726/10 |
| 2007/0277235 A1 * | 11/2007 | Barrett et al. ................ 726/12 |
| 2007/0300220 A1 * | 12/2007 | Seliger et al. ................ 718/1 |
| 2008/0098464 A1 * | 4/2008 | Mizrah ......................... 726/5 |
| 2008/0235779 A1 * | 9/2008 | Bogner ........................ 726/8 |
| 2008/0263629 A1 * | 10/2008 | Anderson ..................... 726/2 |
| 2008/0276308 A1 * | 11/2008 | Graser et al. ................. 726/6 |
| 2008/0301770 A1 | 12/2008 | Kinder |
| 2009/0172820 A1 * | 7/2009 | Watson ........................ 726/26 |
| 2009/0204964 A1 * | 8/2009 | Foley et al. .................. 718/1 |
| 2009/0260007 A1 | 10/2009 | Beaty et al. |
| 2009/0282266 A1 | 11/2009 | Fries et al. |
| 2009/0287571 A1 | 11/2009 | Fujioka |
| 2010/0037296 A1 | 2/2010 | Silverstone |
| 2010/0077469 A1 * | 3/2010 | Furman et al. ............... 726/8 |
| 2010/0146251 A1 | 6/2010 | Lo et al. |
| 2010/0153697 A1 | 6/2010 | Ford et al. |
| 2010/0169640 A1 * | 7/2010 | Smith et al. .................. 713/155 |
| 2011/0107409 A1 * | 5/2011 | Wilkinson et al. ............ 726/8 |
| 2011/0119747 A1 * | 5/2011 | Lambiase ..................... 726/8 |
| 2015/0200932 A1 * | 7/2015 | Wilkinson et al. |

* cited by examiner

PROACTIVE DISTRIBUTION OF VIRTUAL ENVIRONMENT USER CREDENTIALS IN A SINGLE SIGN-ON SYSTEM

CROSS-REFERENCE TO RELATED APPLICATION

This application is a national stage application under 35 U.S.C. §371 of PCT/US2010/040779, filed 1 Jul. 2010.

BACKGROUND

Hypervisors provide a software virtualization environment in which other software, including operating systems, can run with the appearance of full access to the underlying system hardware even though such access is actually under the control of the hypervisor. Embedded bare-metal hypervisors are hypervisors that support the requirements of embedded systems development.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, various methods, systems, an apparatuses introduce a user management framework that integrates the notion of client device user authentication management to a environment manager's handling of virtual machines (VMs). As used herein, an environment manager refers to any entity that manages multiple environments. Environments may include virtual machines, virtual appliances, partitions, hard disk drives, etc. Examples of environment managers include hypervisors, hardware controllers, and VMMs (virtual machine monitors). While embodiments described herein are applicable to any environment manager, various described embodiments refer specifically to a hypervisor implementation. In other words, various embodiments could employ other environment managers besides a hypervisor, as described.

Many hypervisors do not contemplate the notion of a "user," let alone a local device user or an administrator, and therefore do not handle user authentication. By integrating the concept of user profiles (including roles such as, for example, system users) into the hypervisor, embodiments described herein deliver authentication and/or single sign-on (SSO) functionality to virtualized client devices, including virtualized enterprise client devices, allowing users to configure access profiles according to their authorized roles.

A Trusted Client User Management Framework, hereinafter referred to as UMF, implements a scalable architecture to handle multiple user and different profiles, providing security and isolation, on top of a hypervisor, such as a Xen-based hypervisor available from Citrix Systems, Inc. of Fort Lauderdale, Fla. Other specific types of hypervisors, including embedded bare-metal hypervisors, may be used in embodiments described herein. UMF incorporates the concept of hypervisor users and roles, while adding an authentication UI (user Interface) into a hypervisor access control center, referred to herein as an authentication domain. Global environment user identities (GEIDs) may be mapped to user identities for administrative domains of individual environments (e.g., VMs), with support for software appliances. As used herein, a software appliance refers to a software application that includes sufficient operating system (OS) functionality to run as a virtual machine.

Figure 1:
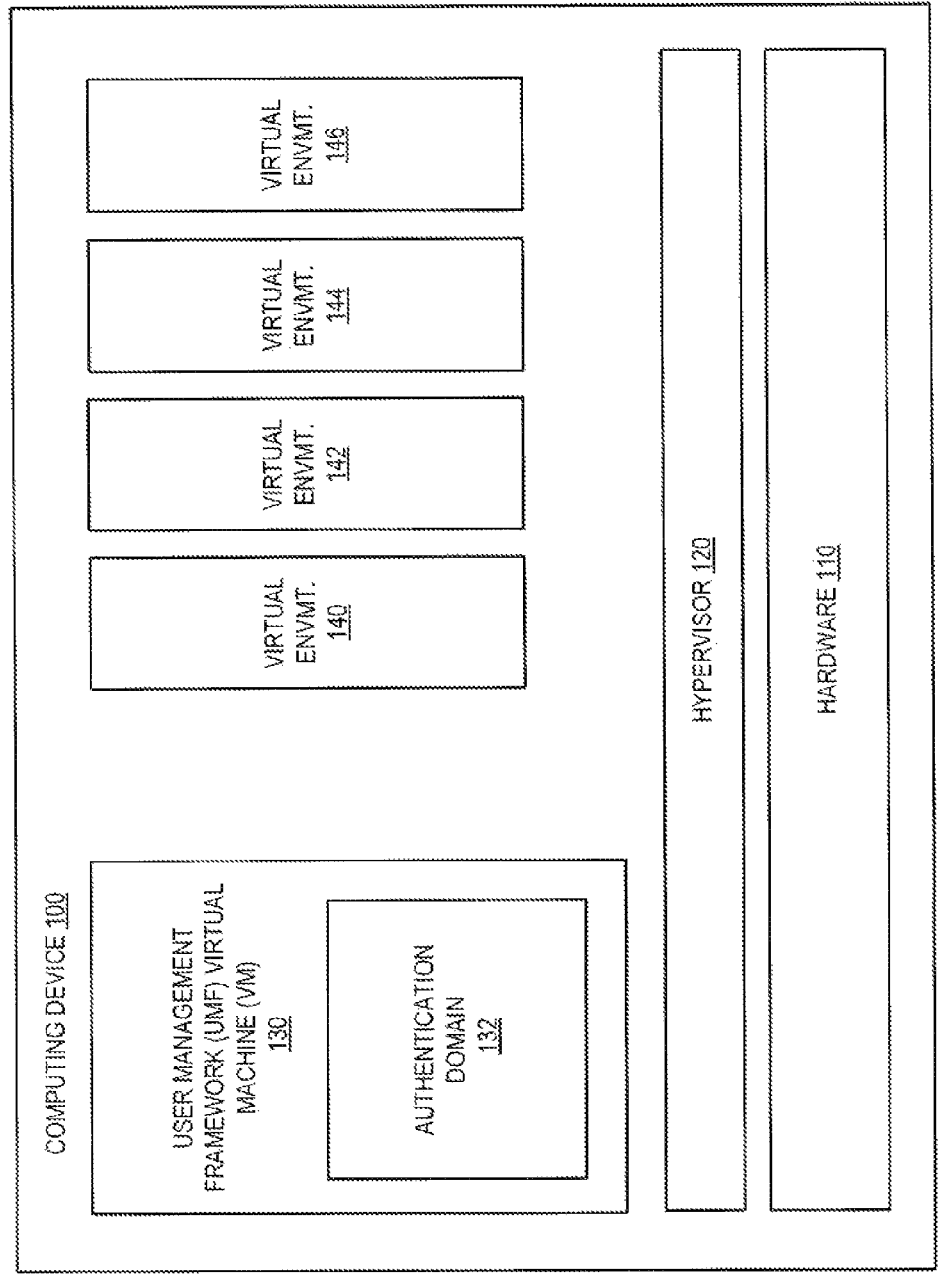
FIG. 1 is a block diagram illustrating a system according to various embodiments.

FIG. 1 is a block diagram illustrating an example of a computing device 100. FIG. 1 includes particular components, modules, etc. according to various embodiments. However, in different embodiments, other components, modules, etc. may be used according to the teachings described herein. Computing device 100 can be any computing device susceptible to virtualization, including notebooks, desktops, workstations and the like. Hypervisor 120 sits "on top" of hardware layer 110, in various embodiments, hypervisor 120 is a "type 1" or "embedded" hypervisor, although "type 2" hypervisors could be used in certain embodiment. Hypervisor 120 can execute multiple virtual environments concurrently. As shown, hypervisor 120 executes UMF VM 130 along with virtual environments 140-146. Each of virtual environments 140-148 can be a guest VM (virtual machine) running a particular operating system (e.g., Windows, Linux, etc), a virtual appliance (e.g., a web browser appliance, etc.), or other suitable virtual environment. As is the nature of virtualization, virtual environments 140-146 are each independent and isolated from each other.

Authentication domain 132 is an extension of hypervisor 120 and runs as a service in UMF virtual machine 130 to support user profile management of virtual environments 140-146. UMF VM 130 may be an independent and privileged VM (e.g., limited access, etc.). Authentication domain 132 maintains at least one global environment user identity (GEID) associated with hypervisor 120. In various embodiments, a GEID defines at least three entities: a user, an authentication policy and a credential. The authentication policy determines which environments are accessible to the user, the conditions for access, and the credential needed for access. A credential, as used herein, refers to any token used to gain access to an environment or other authentication-based process (e.g., BIOS, web browser mail client, etc). Examples of credentials include, but are not limited to, passwords, finger print scans (e.g., via finger scanning), and the like.

Authentication domain 132 uses the GEID to link different user profiles to the same persona. In other words, authentication domain 132 maps other user credentials that are used to access and/or interact with virtual environments 140-146 to the GEID, described in more detail below. In certain embodiments, one or more virtual environments on computing device 100 may not have its own user identity management infrastructure. For example, some environments (e.g., virtual environments) may be deployed by an enterprise, with a centralized user ID management infrastructure, which could he satisfied by the GEID. For virtual environments having an authentication component, linking authentication credentials to the GEID (via registration and/or enrollment with authentication domain 132) facilitates seamless single sign-on (SSO) functionality across all such environments on computing device 100. Authentication domain communicates (e.g., collects and/or distributes authentication credentials, etc.) with virtual environments 140-148 via remote procedure calls, web services, remote function calls, or other suitable communication formats, including security mechanisms that transport credentials.

Figure 2:
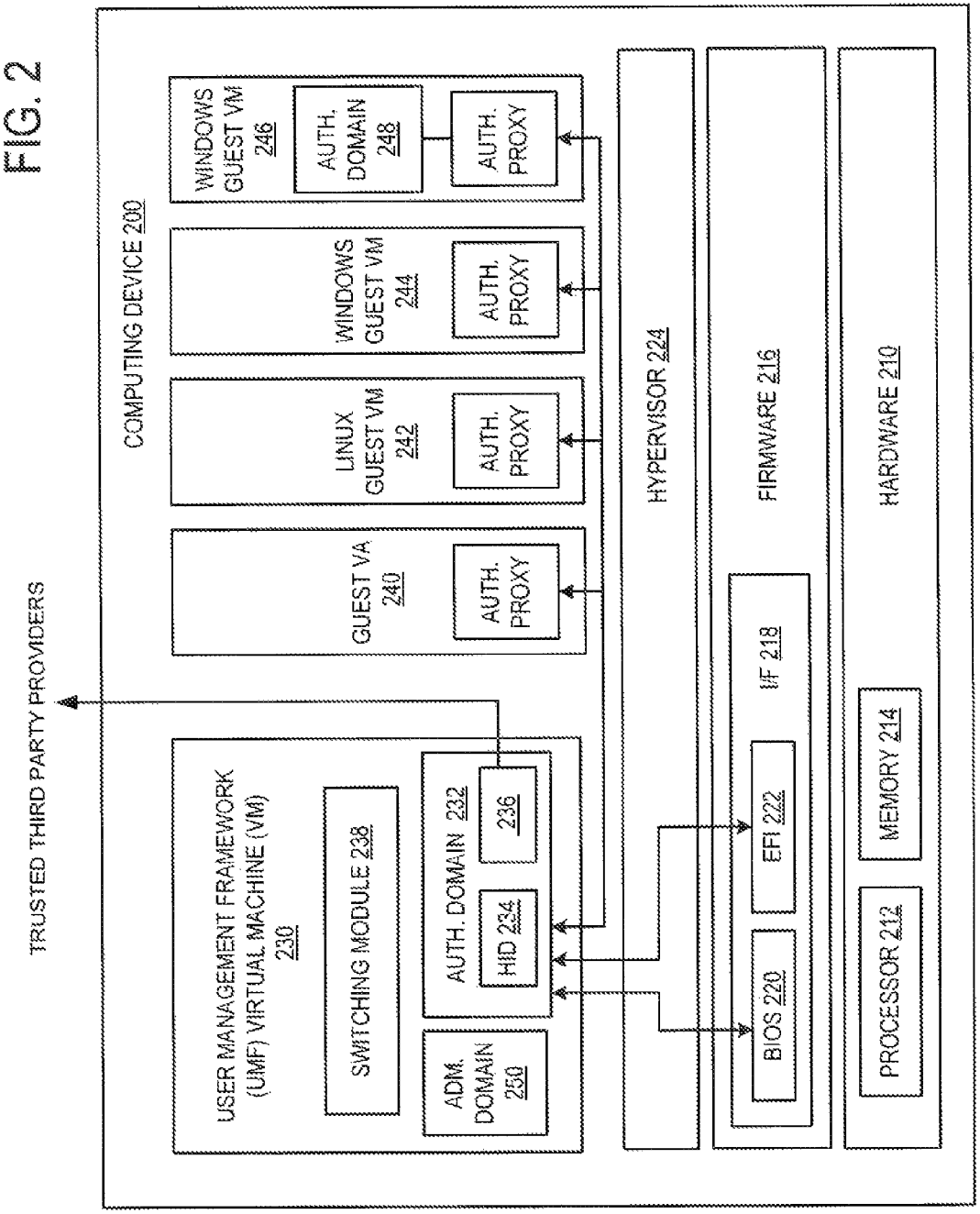
FIG. 2 is a block diagram illustrating a system according to various embodiments.

FIG. 2 is a block diagram illustrating an example of a computing device 100. FIG. 2 includes particular components, modules, etc. according to various embodiments. However, in different embodiments, other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these. In addition, functions and/or operations performed by various components, modules, etc. may be embodied as instructions executable by a processor (e.g., processor 212) and stored in a computer-readable storage medium (e.g., memory 214).

Computing device 200 includes hypervisor 224 sitting "on top" of firmware 216, which sits "on top" of device hardware 210. UMF VM 230 is a privileged virtual machine that functions as an extension of hypervisor 224. Authentication domain 232 interfaces with authentication proxies and other authentication domains, such as those that run in virtual environments 240-246 and those that may run in firmware 216, including in basic input/output system (BIOS) 220 or Extensible Firmware Interface (EFI) 222. In particular, authentication domain 232 interfaces with authentication proxies and/or domains using remote procedure calls (RPCs), web services, remote function calls (RFCs), etc. The use of RPCs and/or RFCs may require additional security mechanisms for transporting credentials.

A global environment user identity (GEID) module 234 manages and maintains GEIDs. Computing device 200 may have one GEID or many GEIDs When a new GEID is created (e.g., during initial system setup), the user can associate installed environments (e.g., virtual appliance 240, VMs, 242-248) with credentials registered with the new GEID. These associations serve as the basis of an access control system that controls which users have access to which environments based on the GEID.

In many traditional computing systems, user authentication takes place at the OS level (e.g., Windows, etc.) in communication with a system BIOS. In various embodiments described herein, authentication domain 232, as an extension of hypervisor 224, moves primary authentication and credential management to the hypervisor level and away from the OS (operating system) level while retaining the ability to create new users in any guest operating system. Thus, authentication domain 232 (as opposed to an operating system) notifies firmware interface 216 (BIOS 220, EFI 222, etc.) of any new user credentials that have been registered (e.g., in conjunction with registering Windows guest VM 244 or other environments).

The first time a new virtual machine—for example, Windows guest VM 244—is activated, authorized user credentials (e.g., password, finger print scan, etc.) are mapped to GEID 234 through an authentication proxy installed on VM 244. Accordingly, upon subsequent activation of VM 244, the authentication proxy will obtain the user's credentials transparently based on authentication done within authentication domain 232 (e.g., based on the user signing in with the GEID). This transparent distribution of credentials gives the user SSO functionality (e.g., signing on to device 200 using GEID grants access to all environments registered to the GEID).

VM 242 and VM 244 are Linux and Windows guests (but could be any type of guest in different embodiments) that include an authentication proxy module that synchronizes user credentials with other VMs, including UMF VM 230, and with firmware interface 218. VM 246 is a guest (e.g., a Windows guest) with its own authentication domain 248. Authentication domain 248 integrates (e.g., via one or more application programming interfaces, or APIs) with the authentication proxy to synchronize user credentials with UMF VM 230. Virtual appliance 240 is a web browser appliance in various embodiments and similarly synchronizes credentials (e.g. for an online user account) with UMF VM 230 via an authentication proxy installed on the VM. Other suitable VAs could be used instead of a web browser VA in alternate embodiments.

Authentication domain 232 does not require that one GEID be manually created for each potential user of computing device 200. Instead, authentication domain 232 includes user authentication policies 236 for handling received user credentials. For example, authentication domain 232 may define an authentication policy 236 mat accepts a valid Google account available from Google Inc. of Mountain View, Calif. In other words, based on the authentication policy, if authentication domain 232 receives user credentials from web browser VA 240 that do not correspond to any GEID, authentication domain 232 may automatically create an internal GEID for that user. In this way, a user can authenticate into hypervisor 224 (via authentication domain 232) using a Google username and password.

Additionally, authentication domain 232 can similarly communicate with trusted third party providers (e.g., OpenID, identity 2.0, OASIS SAML, SAML 2.0, etc.). OpenID is an example of an open, decentralized authentication standard by which a user can logon to one account (e.g., a PayPal account) using a different account (e.g. Google) trusted by the provider. Accordingly, by enrolling a user profile and corresponding credential with GEID 234, authentication domain 232 may provide access to all profiles trusted by the third party provider.

In certain embodiments, not every environment has its own user identify management infrastructure. For example, some environments (e.g., virtual environments) may be deployed by an enterprise that has a centralized user ID management infrastructure. Administrative domain 250, similar to authentication domain 232, enables management of hypervisor 224 resources. Examples of administrative domains include federated domains (e.g., OpenID, Microsoft Passport, etc.), enterprise domains, service provider domains (e.g., GoogleApps, Microsoft Active Directory, etc.), and local platform users. Administrative domain 250 may be accessed remotely and its privileges and/or credentials allow an administrator to set user authentication policies 234, manage GEIDs, and register environments to GEIDs. In various embodiments, computing device 200 may include multiple administrative domains.

A switching module 238 allows a user to switch between environments to which the user is registered. For example, if virtual environments 240-246 are all registered to a user's GEID, then switching module 238 may provide a button, link, window, icon or other suitable mechanism (e.g., via a user interface) to allow the user to switch between virtual environments 240-246.

The following examples illustrate user experiences associated with computing device 200. In the first example, a user uses her notebook to work from home using guest VA 240 (e.g., a remote access VA). By logging into computing device 200 using her GEID, she authenticates herself into the system once, and thereafter has access to all the environments configured (e.g., by registration) for single sign-on under her GEID. However, when the users daughter authenticates to computing device 200, the daughter may only have access to a subset of environments (perhaps designated by her mother).

In another example, John Smith enters the GEID jsmith along with the appropriate GEID credential. Authentication domain 232 determines which of virtual environments 240-246 should be activated and exposed to John Smith, in this example, VA 240 and VM 244 are registered with the GEID jsmith and are activated, VM 242 is not registered with the GEID jsmith, but it is exposed to the user based on the access policy 236. Accordingly, authentication domain 232 exposes an authentication UI for VM 242. Upon verifying the appropriate credential for VM 242, authentication module registers VM 242 with the GEID jsmith and stores the credential for future use with VM 242.

In another example, the user jsmith is a registered GEID in GEID module 234 and BIOS 220 is aware the user and his credentials. Thus, assuming single sign-on (SSO) is enabled (e.g., in access policy 236), the user jsmith could login to computing device 200 via BIOS 220 and receive automatic access to hypervisor 224 and UMF VM 230.

In a yet another example, a user (e.g., that does not have a GEID) enters an enterprise identity for administrative domain 250 from a computing device other than computing device 200. If the user does not yet have credentials for administrative domain 250 on computing device 200, hypervisor 224 exposes an icon for authentication into administrative domain 260 (and perhaps other environments that might be accessible for "any" user of hypervisor 224). If the user authenticates successfully, a GEID is created to be registered with authentication domain 232 and maintained by GEID module 234, the authentication credential for the user and any access control policies are cached, and any other environments accessible to the user via administrative domain 250 are registered to the new GEID.

In a final example, an enterprise configures hypervisor 224 with a Google Chrome OS (available from Google Inc. of Mountain View, Calif.) virtual appliance to provide Internet access when a user accesses hypervisor 224 using, for example, an OpenID identity. When the user logs in to computing device 200 using a Gmail account (registered with GEID 234), authentication domain 232 automatically exposes the Google Chrome OS VA and the user is seamlessly signed in to the Gmail client in the Chrome OS browser.

Figure 3:
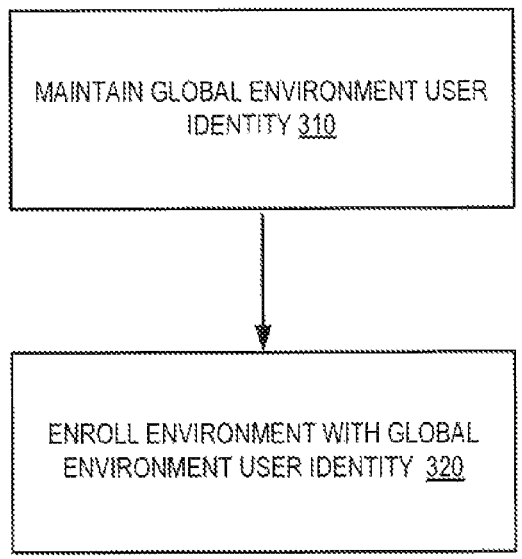
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A privileged virtual machine associated with an environment manager (e.g., hypervisor, VMM, etc.) maintains 310 a global environment user identity (GEID) for a user, in various embodiments, the notion of a user is brought to the hypervisor level (logically lower than the OS level) of a computing device. The global environment user identify includes an accompanying credential. As used herein, the term "privileged" with respect to virtual machines refers to limiting virtual machine access, for example, to those with administrator privileges. In various embodiments, the privileged virtual machine (e.g., the UMF VM described above) is a logical extension and/or component of the hypervisor itself.

The environment manager executes one or more environments (e.g., virtual machines, virtual appliances, etc.). At least one virtual environment is enrolled 320 with the GEID. By enrolling the virtual environment, the computing device can provide SSO functionality to the user for the virtual environment via the GEID. In many traditional systems, including those with a hypervisor, initial system authentication is handled somewhere other than the hypervisor—for example, authentication is frequently bandied by the operating system. However, in various embodiments described herein, initial and/or primary system authentication is controlled by the environment manager (e.g., via GEID). By enrolling a virtual environment with a GEID, the environment manager layer (e.g., hypervisor layer) seamlessly (i.e., transparent to the user) passes credentials to the enrolled virtual environment in response to a user successfully signing in with the GEID to achieve SSO for the user.

Figure 4:
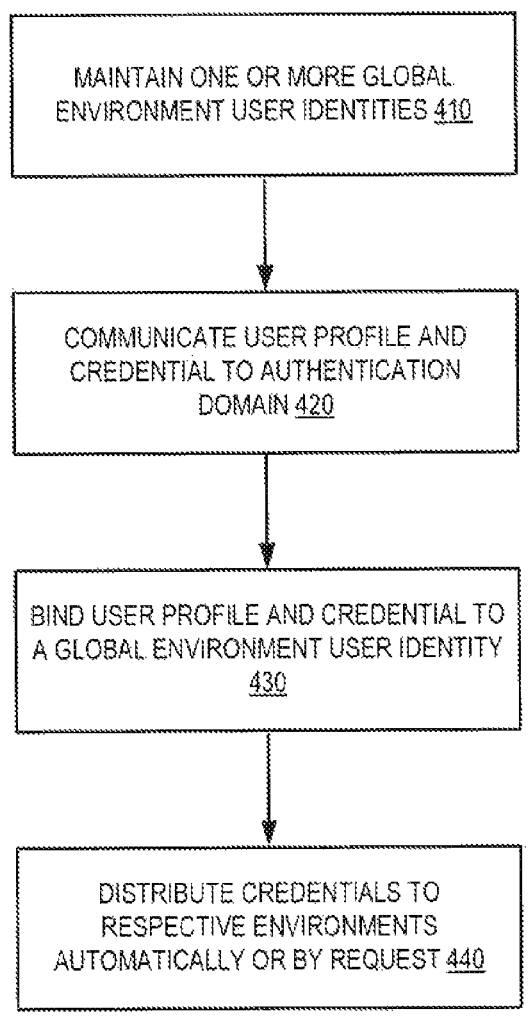
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

An authentication domain executing in a privileged VM associated with a hypervisor on a computer maintains 410 one or more global environment user identities (GEIDs). The hypervisor executes multiple virtual environments concurrently. At least one virtual environment (e.g., a VM, VA, etc.) communicates 420 a user profile and a user profits credential to the authentication domain using an authentication proxy. In various embodiments, communication between the authentication domain and the authentication proxy takes place using remote procedure calls, web service(s), remote function calls, or other suitable communication formats. The user profile and user profile credential (e.g., password, etc.) are bound 430 to a GEID. The GEID may be an existing GEID or the authentication domain can generate a new GEID to correspond to the user profile and credential received from the virtual environment. Multiple profiles (e.g., from separate environments) may be bound to the same GEID. Also, a single environment profile may be bound to multiple GEIDs.

The authentication domain distributes 440 credentials (e.g., passwords, finger print scans, etc.) to respective environments. In some embodiments, the authentication domain "pushes" credentials to registered environments in response to a user successfully inputting the GEID credential for a corresponding GEID. In other embodiments, credentials are "pulled" from the authentication domain, for example, in response to access requests from particular environments. The collecting and/or distributing of user profile credentials may be transparent to the user or they may be explicit to the user. Also, the distribution of credentials may be done in view of one or more access policies.

The above examples and illustrations are not exhaustive of the functionality enabled by the User Management Framework described herein. Other suitable uses, functions, operations, etc. may be similarly enabled by embodiments described herein. Additionally, various modifications may be made to the disclosed embodiments and implementations of the invention without departing from their scope. Therefore, the illustrations and examples herein should be construed in an illustrative, and not a restrictive sense.

The invention claimed is:

1. A computing device, comprising:
   a hardware processor;
   an environment manager, executed by the hardware processor, to execute multiple virtual environments concurrently, the multiple virtual environments comprising:
      a first virtual environment associated with a first credential of a first user;
      a second virtual environment associated with a second credential of the first user; and
      a privileged virtual environment including an authentication domain to maintain a global environment user identity of the first user, and to bind the global environment user identity with at least the first and second credentials of the first user, wherein the global environment user identity authenticates the first user to access the first and second virtual environments, wherein the first virtual environment comprises a first authentication proxy to communicate the first credential to the authentication domain, wherein the second virtual environment comprises a second authentication proxy to communicate the second credential to the authentication domain, wherein the first credential is pulled to the first virtual environment in response to a request to access the first virtual environment.

2. The computing device of claim 1, wherein the authentication domain comprises:
   a global environment user identity module to maintain a plurality of global environment user identities corresponding to a plurality of users; and
   an authentication policy for each virtual environment.

3. The computing device of claim 2, wherein the privileged virtual environment further comprises:
   a switching module to allow the first user to switch between the first and second virtual environments using the global environment user identity.

4. The computing device of claim 1, the authentication domain to communicate with the first authentication proxy and the second authentication proxy via at least one of:
   a remote procedure call (RPC);
   a web service;
   a remote function call (RFC).

5. The computing device of claim 1, further comprising a firmware interface, wherein the authentication domain is further to provide the first and second credentials to the firmware interface.

6. A method, comprising:
   maintaining, by an authentication domain in a privileged virtual machine executed on a computer, a global environment user identity for a user;
   executing, on the computer, a first virtual machine associated with a first credential;
   executing, on the computer, a second virtual machine associated with a second credential;
   binding the first and second credentials with the global environment user identity, wherein the global environment user identity authenticates the user to access the first and second virtual machines;
   communicating the first credential to the authentication domain via a first authentication proxy included in the first virtual machine;
   communicating the second credential to the authentication domain via a second authentication proxy included in the second virtual machine; and
   pulling the first credential to the first virtual machine in response to a request to access the first virtual machine.

7. The method of claim 6, wherein communicating the first and second credentials to the authentication domain comprises communicating via at least one of:
   a remote procedure call (RPC);
   a web service;
   a remote function call (RFC).

8. The method of claim 6, further comprising:
   authenticating, by the authentication domain, the user using the global environment user identity.

9. The method of claim 8, further comprising:
   maintaining, by the authentication domain, an access policy for each of the first and second virtual machines.

10. The method of claim 8, further comprising:
   automatically distributing, by the authentication domain, the first and second credentials to the first and second virtual machines in response to the user successfully providing the global environment user identity as input to the computer.

11. The method of claim 8, further comprising:
   automatically distributing, by the authentication domain, the first and second credentials to a firmware interface in response to the user successfully providing the global environment user identity as input to the computer.

12. The method of claim 8, further comprising:
   maintaining additional global environment user identities in the privileged virtual machine on the computer.

13. A non-transitory computer-readable storage medium containing instructions that, when executed, cause a computer to:
   maintain, by an authentication domain in a privileged virtual machine associated with a hypervisor on a computer, a global environment user identity for a user;
   execute a first virtual machine associated with a first credential;
   execute a second virtual machine associated with a second credential;
   bind the first and second credentials with the global environment user identity, wherein the global environment user identity authenticates the user to access the first and second virtual machines;
   send the first credential from the first virtual machine to the authentication domain via a first authentication proxy included in the first virtual machine;
   send the second credential from the second virtual machine to the authentication domain via a second authentication proxy included in the second virtual machine; and
   pull the first credential to the first virtual machine in response to a request to access the first virtual machine.

14. The computer-readable storage medium of claim 13, comprising further instructions that cause the computer to:
   automatically push the first credential from the authentication domain to the first virtual machine in response to the user providing the global environment user identity as input to the computer.

15. The computer-readable storage medium of claim 13, comprising further instructions that cause the computer to:
   distribute the first and second credentials from the privileged virtual machine to a firmware interface in response to authenticating the global environment user identity.

* * * * *